(No Model.)
W. E. BURK.
MECHANICAL MOVEMENT.
No. 277,988. Patented May 22, 1883.
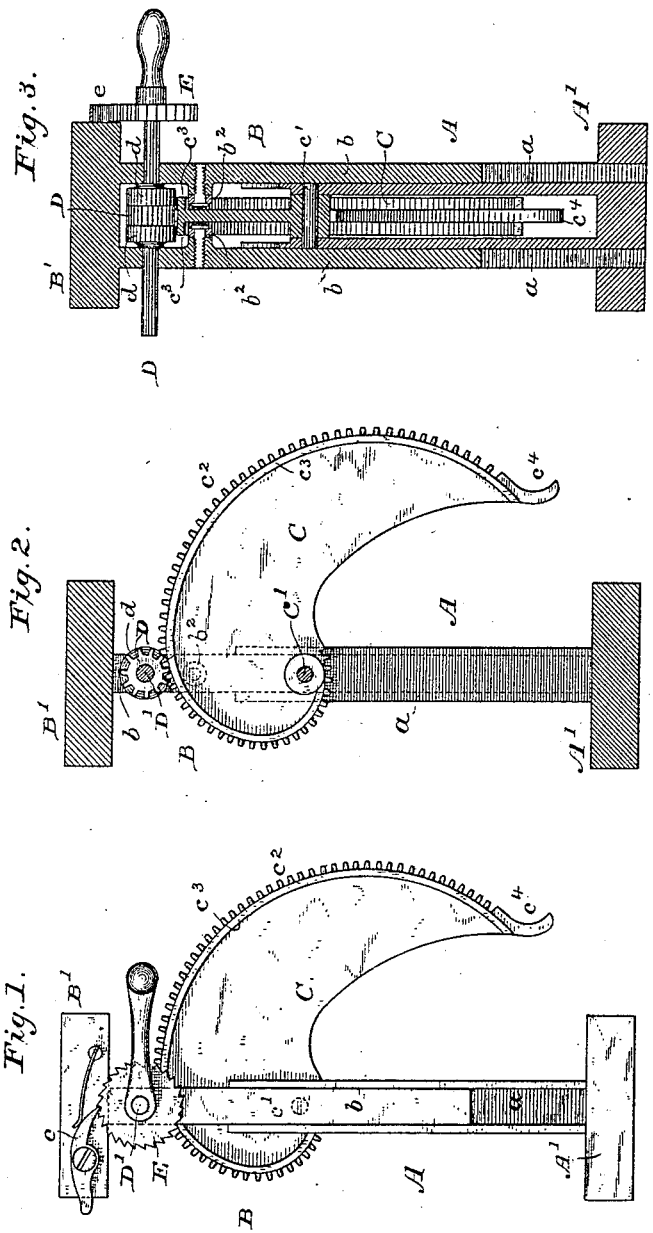
WITNESSES:
Wm A. Skinkle
H. W. Elmore
INVENTOR:
William E. Burk,
By his Attorneys,
Baldwin, Hopkins & Peyton

UNITED STATES PATENT OFFICE.

WILLIAM E. BURK, OF PHILADELPHIA, PENNSYLVANIA, ASSIGNOR TO THE S. S. WHITE DENTAL MANUFACTURING COMPANY, OF SAME PLACE.

MECHANICAL MOVEMENT.

SPECIFICATION forming part of Letters Patent No. 277,988, dated May 22, 1883.

Application filed April 25, 1883. (No model.)

*To all whom it may concern:*

Be it known that I, WILLIAM E. BURK, of the city and county of Philadelphia, in the State of Pennsylvania, have invented a certain new and useful Mechanical Movement, of which the following is a specification.

My invention relates to an improvement in mechanical movements more especially designed for moving or reciprocating or elevating weights or bodies; and its object is to provide a movement which will accomplish these results, and the mechanism of which is simple, strong, and easily operated, and capable of moving comparatively heavy weights or bodies with the exertion of little power.

The subject-matter claimed is particularly pointed out at the close of the specification.

Some of the improvements claimed may be used without the others, and the details may be varied.

In the accompanying drawings, Figure 1 is a view in elevation of one form of embodying my improvements, which form is the best one for general purposes of elevating or lowering weights or bodies now known to me. Fig. 2 is a vertical section through the apparatus, and Fig. 3 is a similar section through the apparatus at right angles to the plane of section of Fig. 2.

A suitable frame, A, is provided with guides or standards $a$, in or on which arms or rods $b\ b$ of a frame, B, slide or reciprocate. In this illustration of my improvements the frame A is a vertical one, having a base, A', while the arms $b\ b$ of the frame B carry at their upper ends a platform or connection, B', upon which or to which the body or weight to be elevated or moved is rested or connected.

Journaled between the guides $a$ of the frame A is a preferably metallic plate or figure, C, the outer edge or periphery of which is preferably substantially an involute curve, said plate or figure being capable of being turned on its trunnions or axis $c'$. Upon the outer periphery of this plate or figure C are in this instance gear-teeth $c^2$, and below the teeth, on each side thereof preferably, is a peripheral flange, $c^3$, on the same curve as the teeth of the plate. The gear-teeth are for the purpose of giving motion to the plate or irregular figure C upon its axis, while the flanges $c^3$ bear the thrust, push, or weight of the object to be moved or elevated, so as to take the strain off said teeth.

Between the arms $b\ b$ of the sliding frame B is journaled a pinion-wheel, D, on each side of which, and mounted upon the same shaft D' as the pinion D, are plain friction-rollers $d\ d$, which bear upon the flanges $c^3$ of the figure C, before described. The teeth of the pinion D are in this instance on a reduced diameter relatively to the periphery of the rollers $d\ d$, and the elevating or thrusting strain on the pinion is consequently avoided. A suitable crank or handle or other driving-connection is connected with the shaft D' to rotate it in its bearings in the sliding frame B. A ratchet-wheel, E, is mounted upon said shaft D', and its teeth are engaged by a pawl, $e$, pivoted to the sliding frame B, whereby back movement of said frame and the object carried thereby is prevented until the pawl is disengaged, and consequently any forward movement imparted to said frame B is preserved, even if the frame be arranged to slide vertically. Any other suitable clutching device may be substituted for the ratchet-pawl.

In operation the shaft D' is turned by its crank or driving connection. The rotation of the driving-pinion D imparts motion to the plate or irregular figure C upon its axis, and as the distance from its axis to its periphery is gradually increased relatively to the sliding driving mechanism during the turning movement of the figure it will be obvious that the frame B will be moved upward in its guides, and the object carried by said frame elevated by the lifting action of the curved flanges $c^3$ on the rollers $d\ d$. This increase of distance from the axis of the figure to its flanged periphery while said figure is being turned on its axis is gradual, and causes the lifting action imparted to the frame B. The organization is such that with but little force applied to the shaft of the driving-pinion the pinion can be rotated, and by the lifting action of the curved figure comparatively heavy weights or objects can be moved, reciprocated, or elevated or lowered. The curved figure is provided at its outer end with a stop, $c^4$, to limit its movement about its axis between the guides or standards of the frame A. In some cases it will only be necessary to force the sliding frame B and the platform or connection thereof forward or outward positively by the curved figure, backward movement of the frame B being effected by hand or otherwise. In other cases it is desirable not only to impart the lifting or forward movement to the frame B, but also to positively move said frame backward or in a reverse direction in elevating and lowering, or in moving or reciprocating the object or weight carried by or connected with the platform or connection of said frame. To this end I have provided the sliding frame B with rollers $b^2$, journaled to the frame in such manner as to lie directly below or behind the curved flanges $c^3$ of the figure C, whereby it will be seen that by a forward movement the curved figure will move the frame B outward or forward, while a reverse rotation of the driving-pinion will cause a positive backward movement of said frame by reason of the action of the curved flanges on the rollers $b^2$, as will be obvious.

What I claim herein as of my invention is—

1. The combination, substantially as hereinbefore set forth, of a curved figure or plate mounted upon an axis in a frame, with a driving mechanism mounted in a sliding frame to turn said figure upon its axis and be moved thereby.

2. The combination, substantially as hereinbefore set forth, of a curved figure or plate mounted upon an axis in a frame, with a driving mechanism mounted in a frame movable in a right line to turn said figure upon its axis and be moved thereby.

3. The combination, substantially as hereinbefore set forth, of two frames movable relatively to each other, one of which carries a driving mechanism and the other of which carries a curved figure driven by said driving mechanism, whereby the operation of the driving mechanism causes the movement of one of said frames relatively to the other.

4. The combination, substantially as hereinbefore set forth, of a frame, a curved figure journaled therein, a driving-wheel turning in a frame movable relatively to said first-mentioned frame and engaging the periphery of said curved figure, and the driving-connection fitted to the shaft of said driving-wheel to turn it to move one of said frames upon the other.

5. In a mechanical movement, a curved figure having a driving-surface at its periphery and on one or both sides thereof a lifting or thrusting surface, substantially as described.

6. The combination of a frame in which a curved figure is mounted upon an axis, with another frame fitted to slide relatively to the first-mentioned frame, and carrying a driving-connection by which to turn said curved figure on its axis, said driving-connection having a driving-surface and a lifting or thrusting surface corresponding to similar surfaces on the periphery of the curved figure, substantially as set forth.

7. In a mechanical movement, a curved figure having a driving-surface and a lifting or thrusting surface, in combination with a sliding frame movable by said figure positively in either direction, substantially as described.

8. The combination of a frame in which a curved figure having its periphery provided with gear-teeth is journaled, with a sliding frame movable relatively to said first-mentioned frame and carrying a pinion the teeth of which mesh with the teeth of the curved figure to rotate said figure about its axis and thereby impart movement to said sliding frame, substantially as described.

In testimony whereof I have hereunto subscribed my name this 24th day of April, A. D. 1883.

WILLIAM E. BURK.

Witnesses:
FRANK L. HISE,
WM. W. KENDALL.